US009349216B2

(12) United States Patent
Takayama et al.

(10) Patent No.: US 9,349,216 B2
(45) Date of Patent: May 24, 2016

(54) SKETCH-BASED GENERATION AND EDITING OF QUAD MESHES

(71) Applicant: Disney Enterpries, Inc., Burbank, CA (US)

(72) Inventors: Kenshi Takayama, Zurich (CH); Daniele Panozzo, Zurich (CH); Alexander Sorkine-Hornung, Zurich (CH); Olga Sorkine-Hornung, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 283 days.

(21) Appl. No.: 14/044,114

(22) Filed: Oct. 2, 2013

(65) Prior Publication Data

US 2015/0002510 A1    Jan. 1, 2015

Related U.S. Application Data

(60) Provisional application No. 61/840,572, filed on Jun. 28, 2013.

(51) Int. Cl.
*G06T 17/20* (2006.01)
(52) U.S. Cl.
CPC ............... *G06T 17/20* (2013.01); *G06T 17/205* (2013.01)

(58) Field of Classification Search
CPC ....... G06T 17/20; G06T 17/205; G06T 17/30; G06T 17/00; G06T 11/20; G06F 17/50; G06F 17/5018
See application file for complete search history.

(56) References Cited

PUBLICATIONS

Bommes, David, et al. "Quad-Mesh Generation and Processing: A Survey." Computer Graphics Forum. vol. 32. No. 6. Sep. 2013.*
Schaefer, Scott, Joe Warren, and Denis Zorin. "Lofting curve networks using subdivision surfaces." Proceedings of the 2004 Eurographics/ACM SIGGRAPH symposium on Geometry processing. ACM, 2004.*
Nasri, A., M. Sabin, and Z. Yasseen. "Filling N- Sided Regions by Quad Meshes for Subdivision Surfaces." Computer Graphics Forum. vol. 28. No. 6. Blackwell Publishing Ltd, 2009.*

(Continued)

*Primary Examiner* — Gregory J Tryder
*Assistant Examiner* — Scott E Sonners
(74) *Attorney, Agent, or Firm* — Patterson + Sheridan, LLP

(57) ABSTRACT

System, method, and computer program product to perform an operation, comprising sampling a plurality of points and a plurality of segments of a curve on a surface of a three-dimensional model, storing each sampled point as a respective vertex of a plurality of vertices and each sampled segment as a respective half-edge in a curve network of the model surface, upon determining that a first half-edge and a second half-edge connect two of the plurality of vertices, generating a first halfchain connecting the first half-edge and the second half-edge, wherein each connected vertex comprises either a corner or an open endpoint, and upon determining that three consecutive halfchains form a loop comprising at least three corners, generating a first patch for a space enclosed by the loop, wherein the first patch is represented as a quad mesh with a respective set of vertices, faces, and half-edges.

30 Claims, 13 Drawing Sheets
(9 of 13 Drawing Sheet(s) Filed in Color)

(56) References Cited

PUBLICATIONS

Takayama, Kenshi et al., Robust and Controllable Quadrangulation of Triangular and Rectangular Regions, Technical Report, Jan. 2013, ETH Zurich Institute for Visual Computing, Zurich, Switzerland.

Takayama, Kenshi et al., Sketch-based generation and editing of quad meshes, ACM Transactions on Graphics (TOG)—SIGGRAPH 2013 Conference Proceedings, Jul. 2013, vol. 32, Issue 4, ACM, New York, United States.

* cited by examiner

1200

QUAD MESH APPLICATION  112

SPINE SKETCHING TOOL   1201

AUTOCOMPLETE TOOL   1202

FIG. 12

SKETCH-BASED GENERATION AND EDITING OF QUAD MESHES

CROSS-REFERENCE TO RELATED APPLICATIONS

This application claims benefit of U.S. provisional patent application Ser. No. 61/840,572, filed Jun. 28, 2013, which is herein incorporated by reference in its entirety.

BACKGROUND

Description of the Related Art

Generating pure quadrilateral (quad) meshes is an important step in the production pipeline of movies, videos, and video games, where the Catmull-Clark subdivision is ubiquitously used to generate smooth surfaces. The quality of a quad mesh and its suitability to a given application depends heavily on the placement of the singularities (i.e., vertices where more or less than four quadrilaterals meet), and on the alignment of the mesh with semantic features. The latter often does not correspond to geometric notions such as principal curvature directions. For example, artists may prefer a certain anisotropy in flat or spherical parts of the model because they anticipate deformations due to articulation of the shape. Important concepts in this respect are the so-called "edge flow" and "edge loops"—chains of consecutive edges in the quad mesh that can locally be thought of as the grid lines. Artists and designers often wish to explicitly control the edge flow and be able to prescribe precise positioning of edge loops.

Optimizing the alignment of the quad mesh and the amount and positions of singularities is a challenging task due to the global effect of every change in the quad mesh connectivity. It is generally impossible to refine, coarsen or otherwise edit a quad mesh only locally without introducing additional singularities. Thus, automatic quad meshing methods cast the problem as a single, mixed-integer, global energy minimization and solve it using customized greedy solvers. Due to the inherent complexity of the problem, it is not feasible to expose to the user the control over every single quadrilateral or edge loop while still producing high-quality meshes with low metric distortion. In other words, while influencing the overall alignment of the mesh to a given field of directions is already achieved by the mentioned automatic methods, hard constraints on edge loops, placement of singularities and other editing operations are not fully supported. This is a major limitation that restricts the practical usability of existing methods to the generation of dense quad meshes, where a fine level of control is not required. Even in this setting, it is common to manually remesh parts of the surface to improve their quality.

Manually generating quad meshes has not received much attention in the research community or in the industry. Most modeling packages provide tools to manually retopologize surfaces (i.e., convert a triangle mesh into a quad mesh), that ultimately reduce to manual placement of the majority of the vertices. These tools allow full control over the mesh, but modeling quad meshes is slow and requires a lot of redundant user input. Further, it is often quite challenging even for professional artists to manually design a perfect quad mesh on the first try. Since the quality of a quad mesh is a global property, the correction of a single mistake might require regeneration of the entire mesh.

SUMMARY

Embodiments disclosed herein provide a system, method, and computer program product to perform an operation, comprising sampling a plurality of points and a plurality of segments of a curve on a surface of a three-dimensional model, storing each sampled point as a respective vertex of a plurality of vertices and each sampled segment as a respective half-edge in a curve network of the model surface, upon determining that a first half-edge and a second half-edge connect two of the plurality of vertices, generating a first halfchain connecting the first half-edge and the second half-edge, wherein each connected vertex comprises either a corner or an open endpoint, and upon determining that three consecutive halfchains form a loop comprising at least three corners, generating a first patch for a space enclosed by the loop, wherein the first patch is represented as a quad mesh with a respective set of vertices, faces, and half-edges.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

Figure 1:
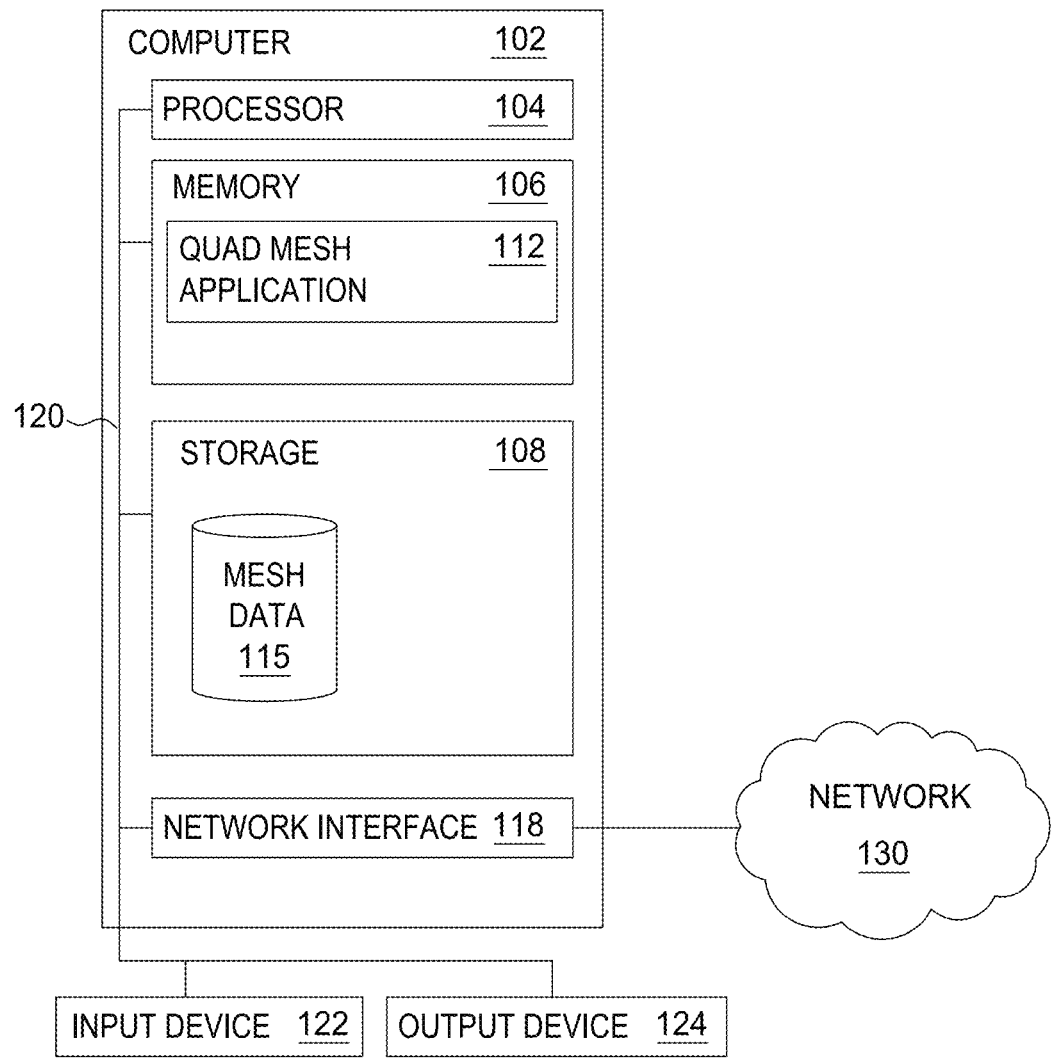

FIG. 1 illustrates a system for sketch-based generating and editing of quad meshes, according to one embodiment.

Figure 2A:
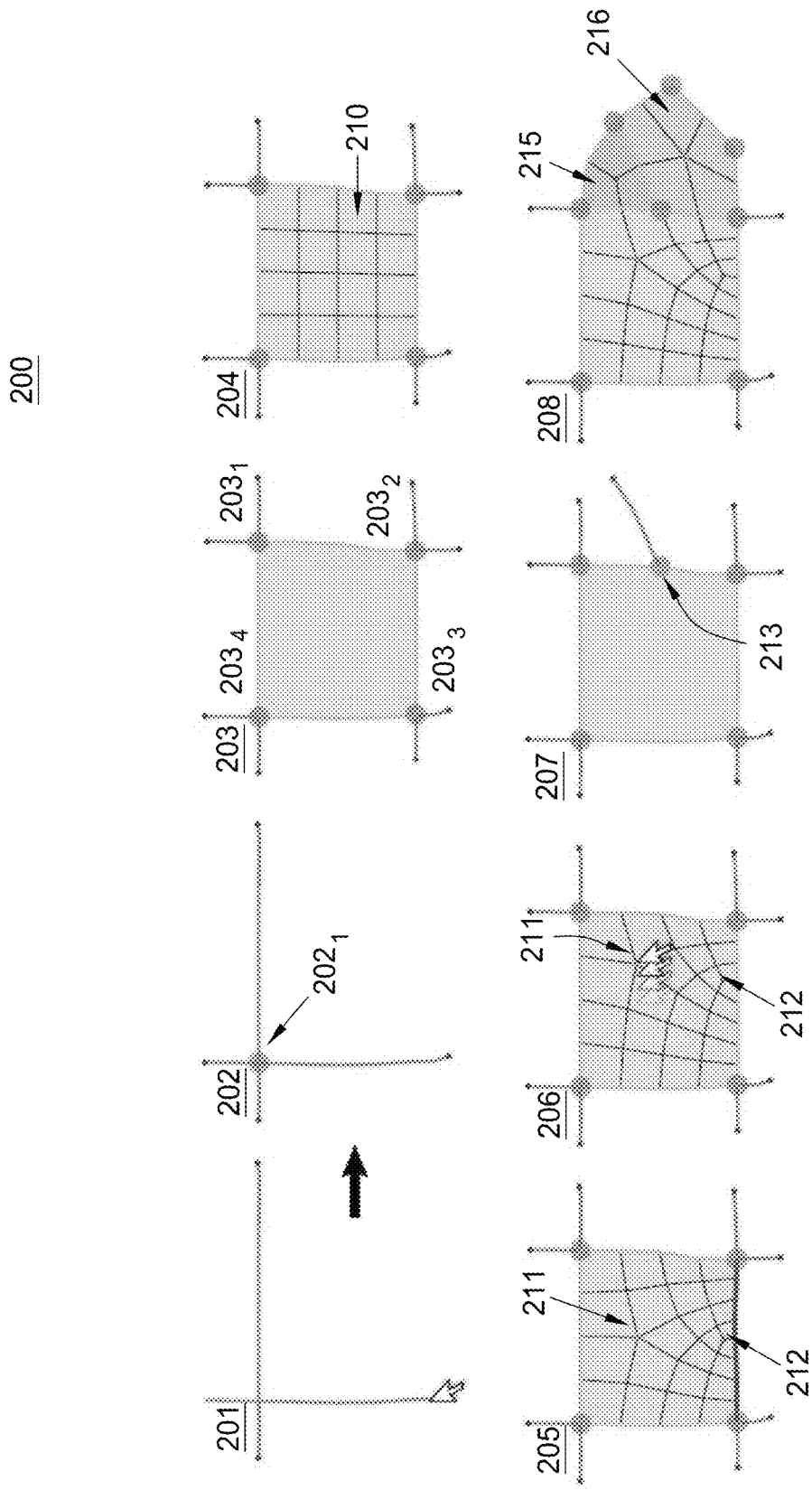
Figure 2B:
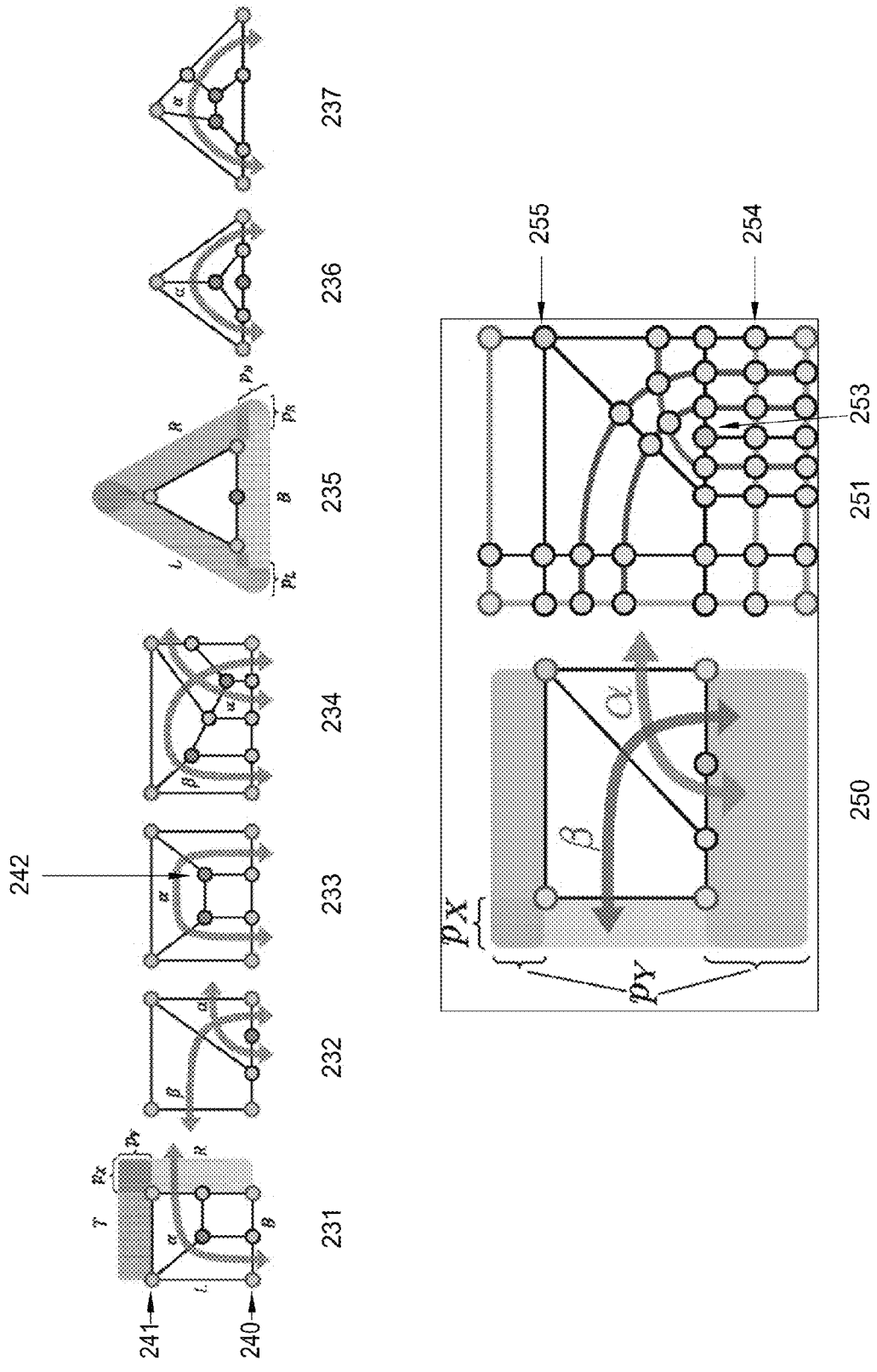

FIGS. 2A-2B illustrate techniques for generating and editing of quad meshes, according to one embodiment.

Figure 3:
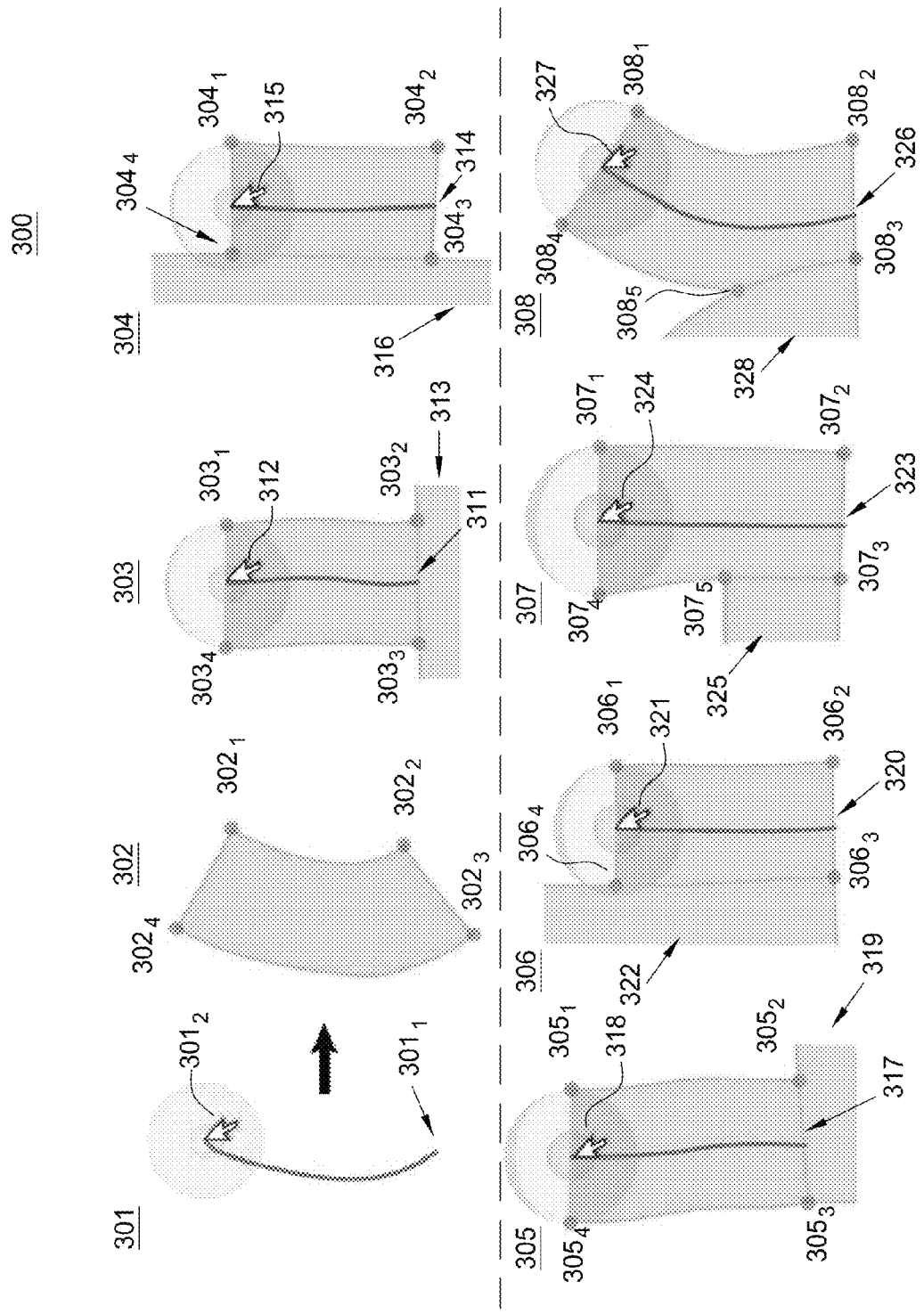

FIG. 3 illustrates a spine sketching tool for generating patches, according to one embodiment.

Figure 4:
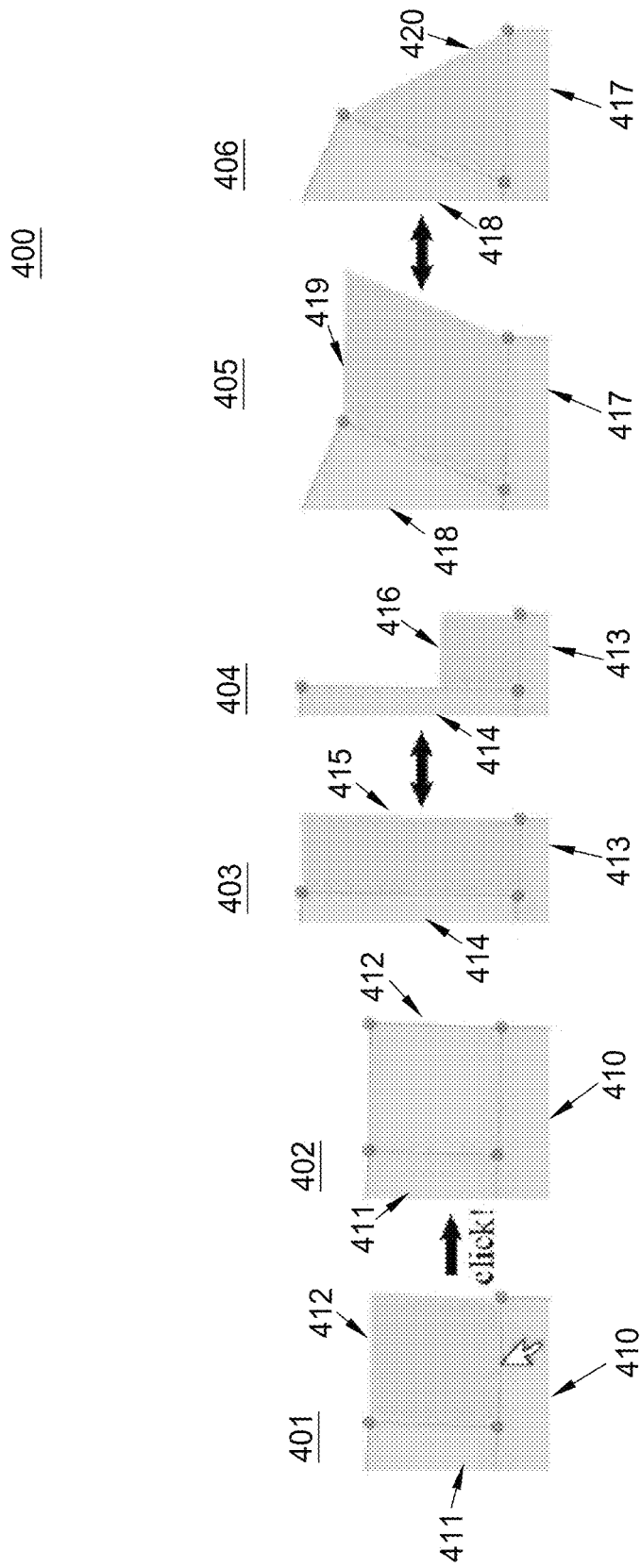

FIG. 4 illustrates an autocomplete tool for generating patches, according to one embodiment.

Figure 5:
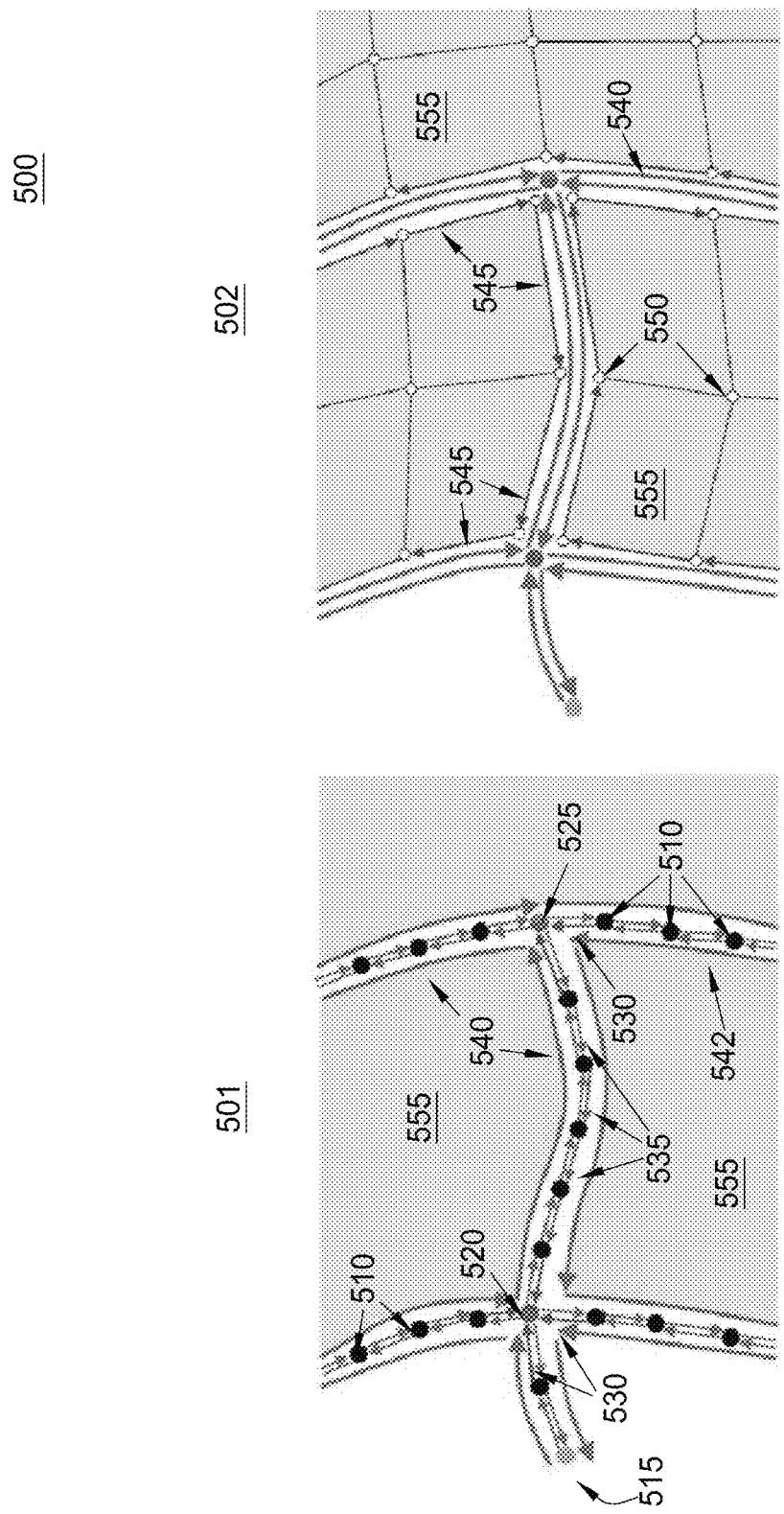

FIG. 5 illustrates a curve network representation, according to one embodiment.

Figure 6:
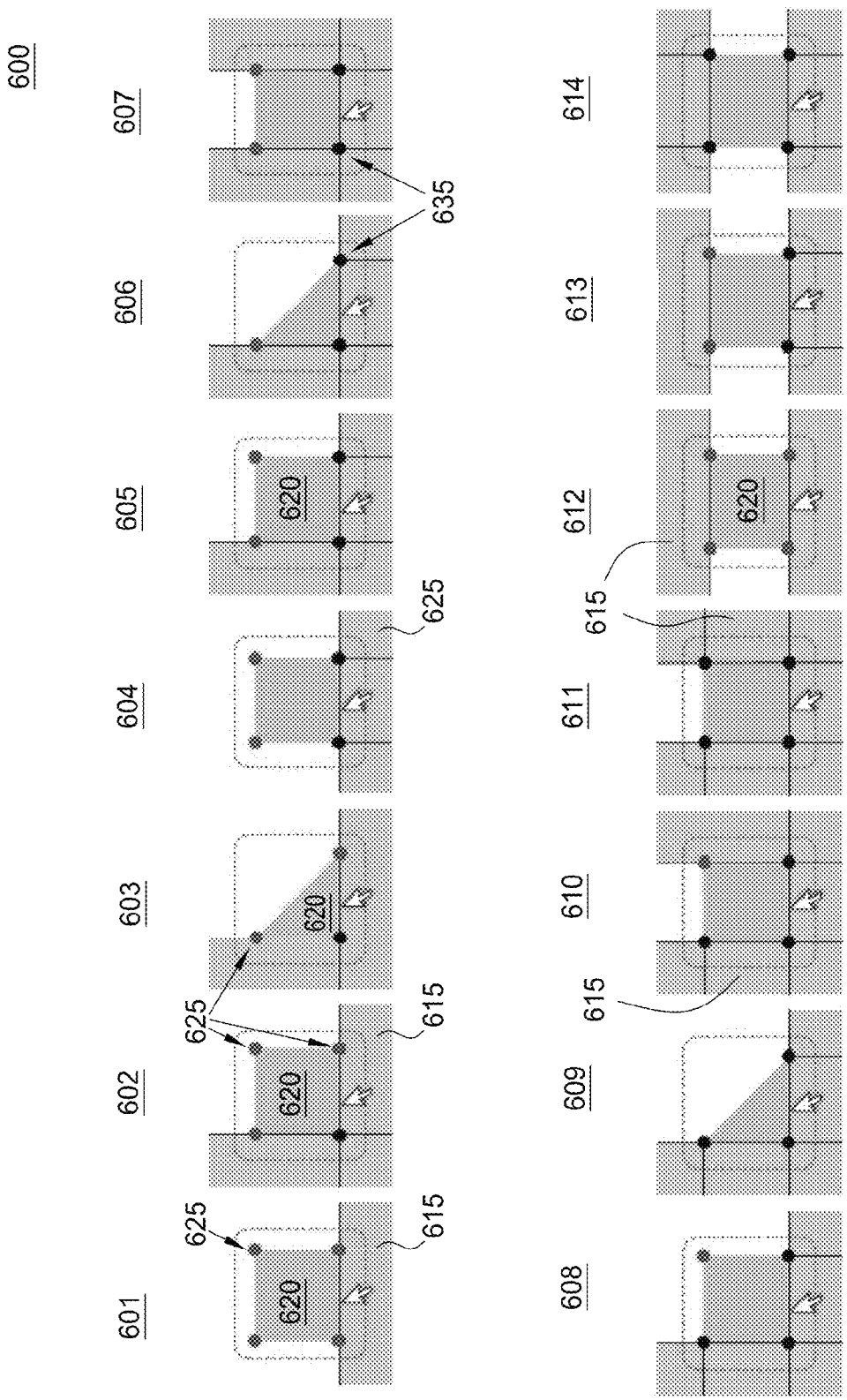

FIG. 6 illustrates configurations considered by the autocomplete tool, according to one embodiment.

Figure 7:
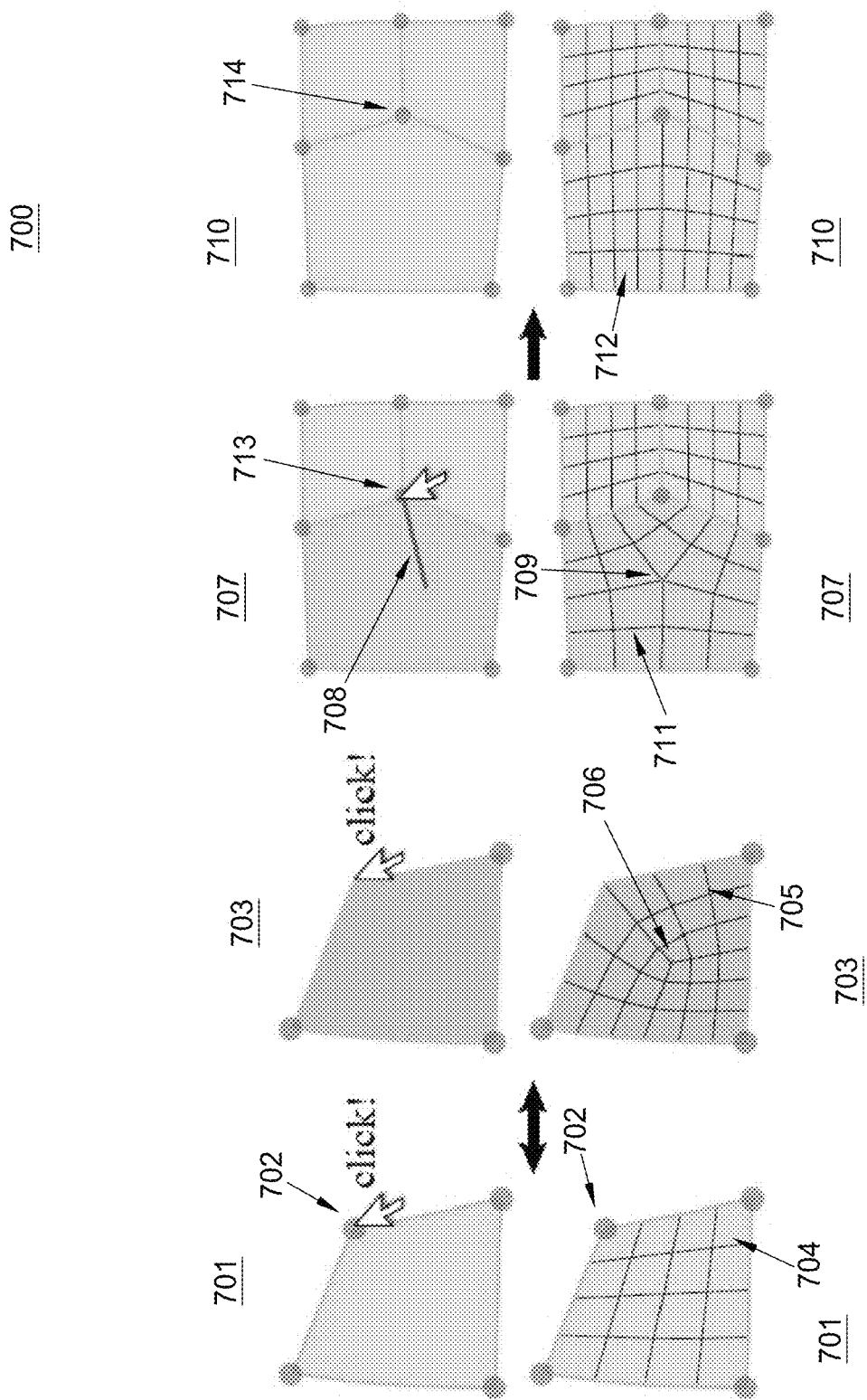

FIG. 7 illustrates techniques to edit quad meshes, according to one embodiment.

Figure 8:
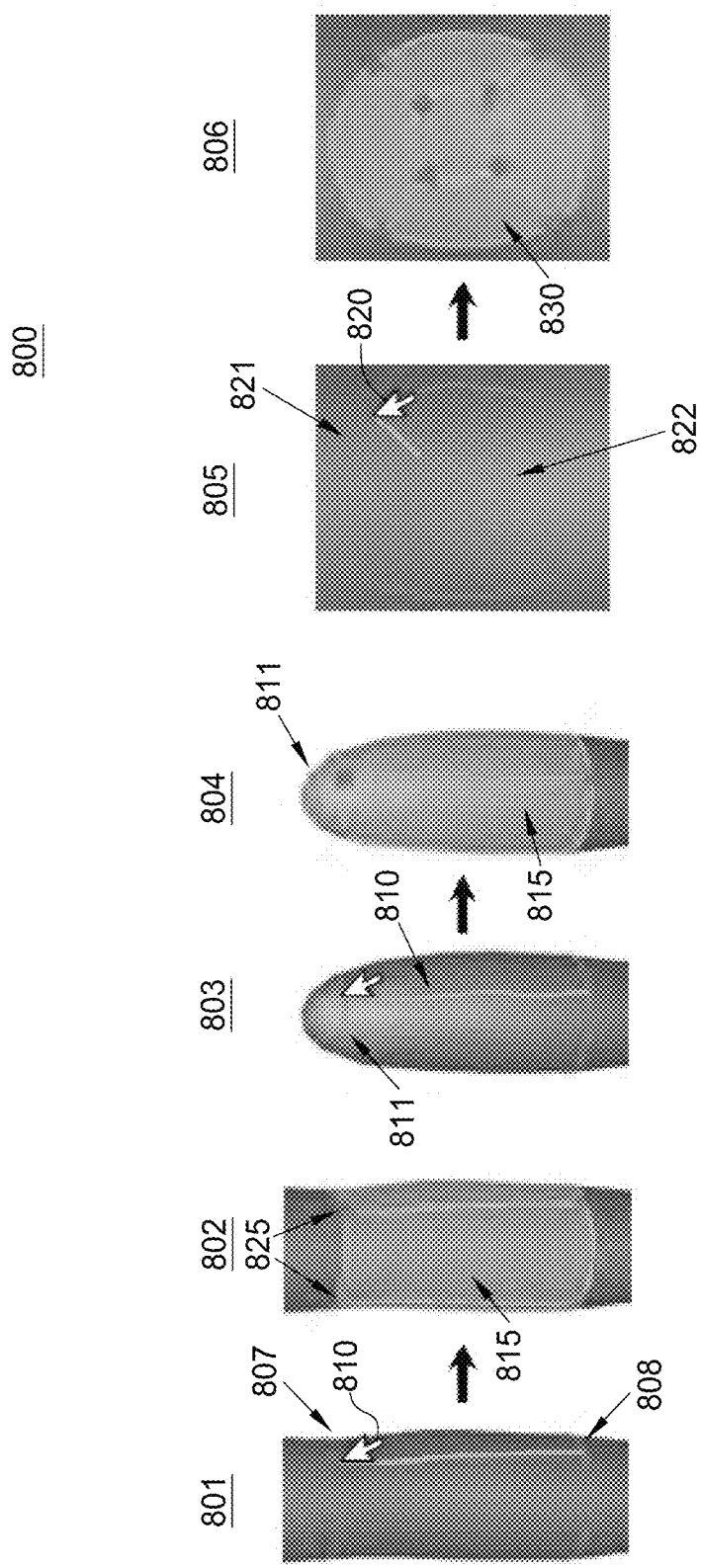

FIG. 8 illustrates cylinder sketching techniques, according to one embodiment.

Figure 9:
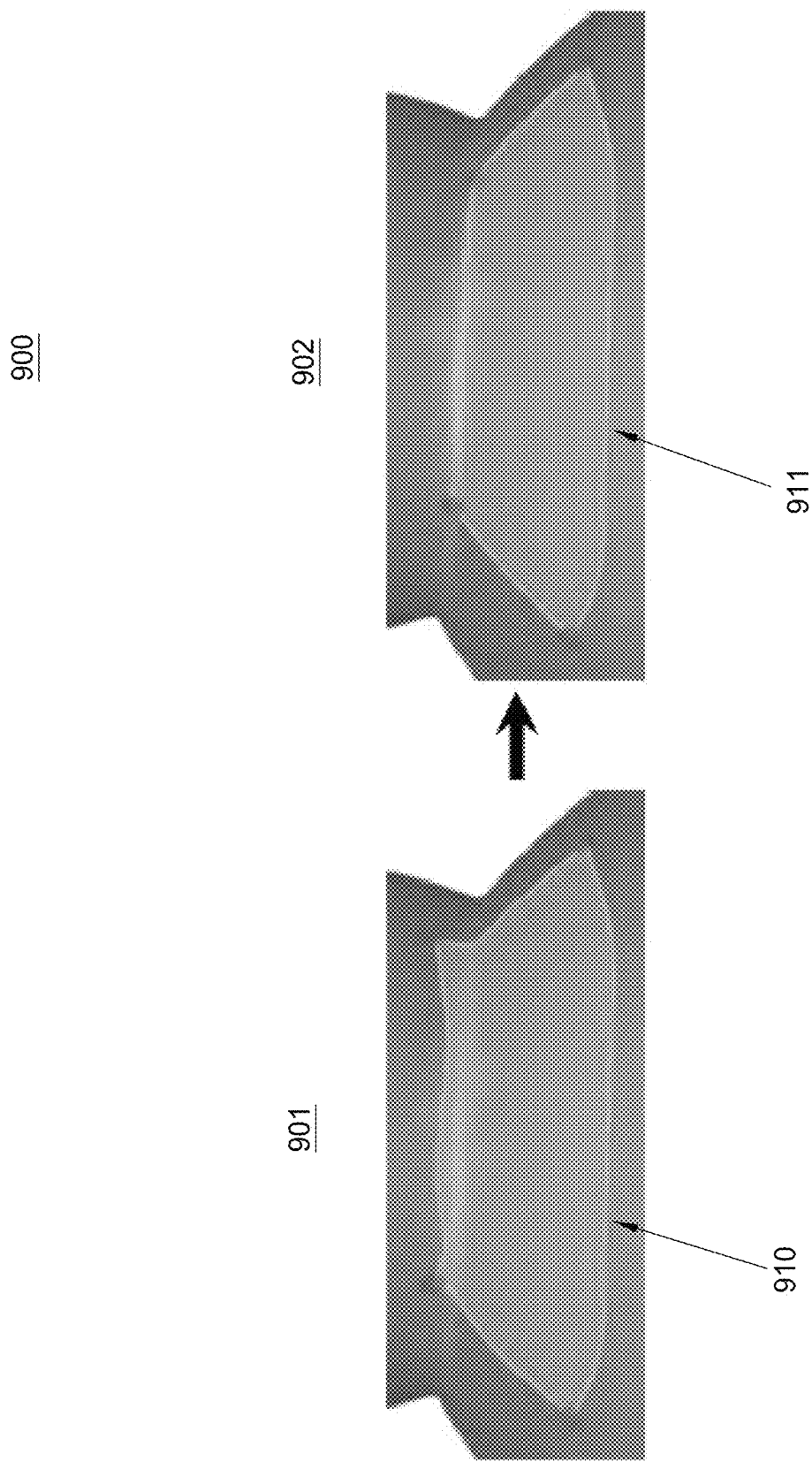

FIG. 9 illustrates techniques to align a quad mesh with salient geometric features of a model, according to one embodiment.

Figure 10:
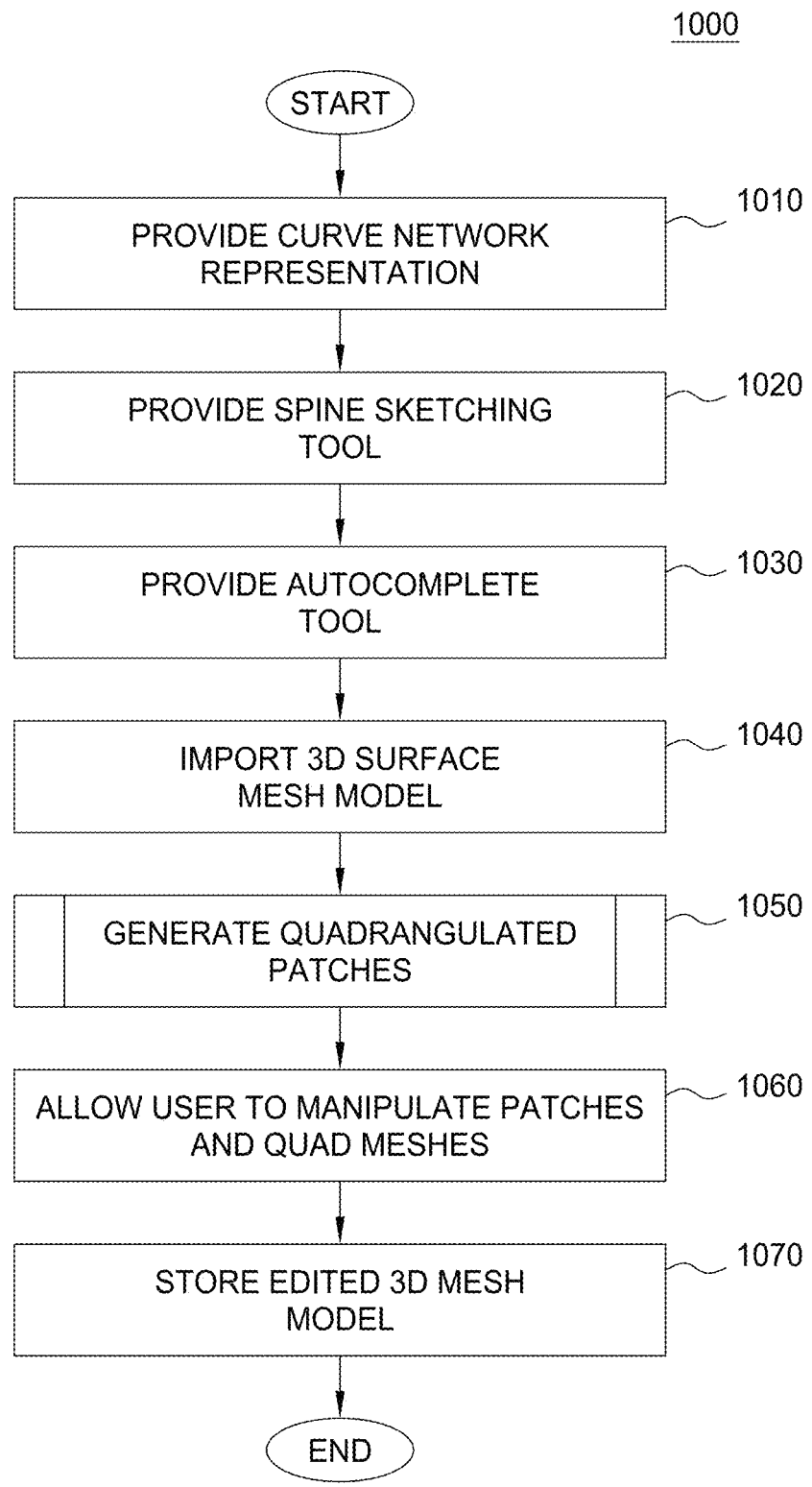

FIG. 10 illustrates a method for sketch-based generating and editing of quad meshes, according to one embodiment.

Figure 11:
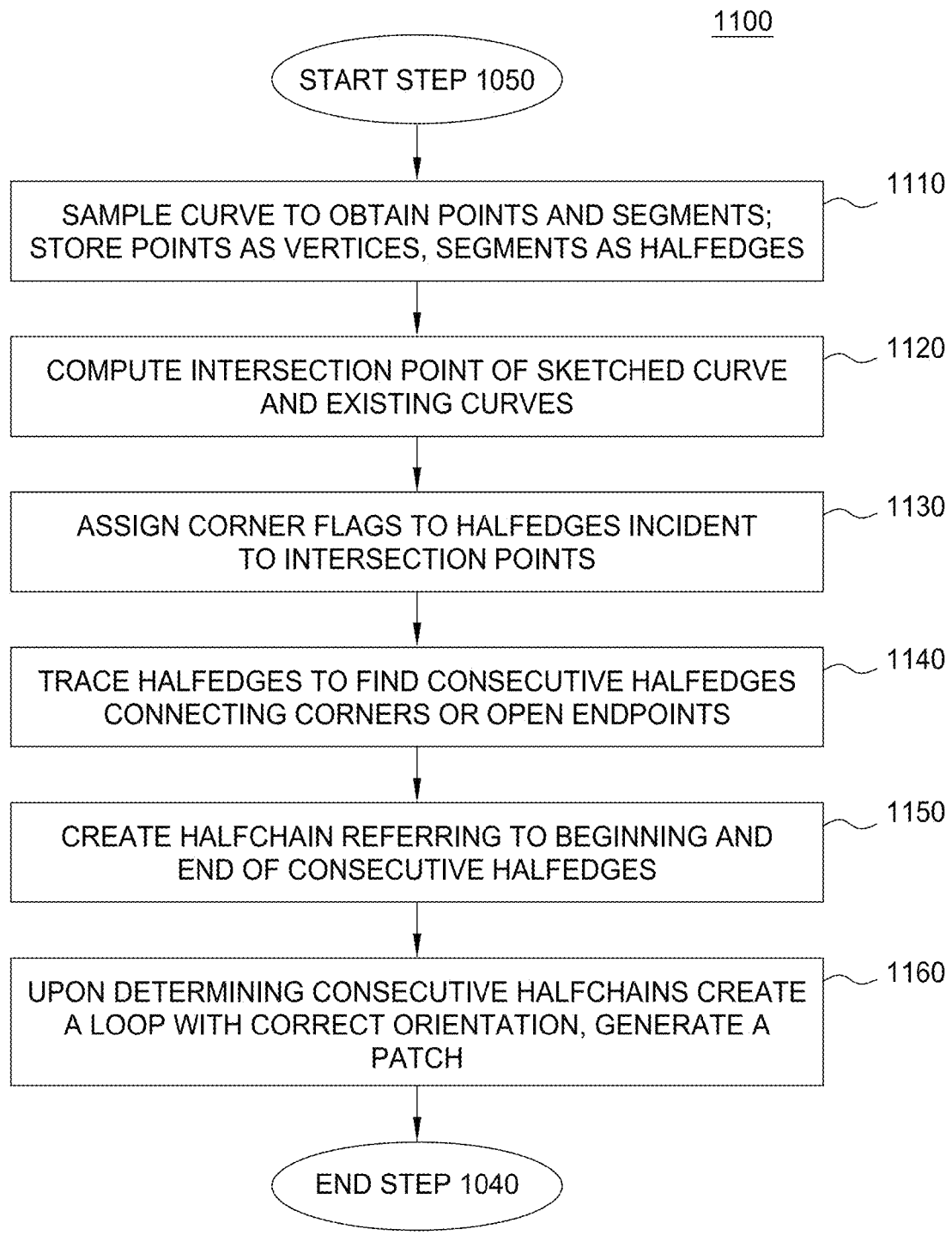

FIG. 11 illustrates a method to generate patches, according to one embodiment.

FIG. 12 illustrates components of a quad mesh application, according to one embodiment.

DETAILED DESCRIPTION

Embodiments disclosed herein provide an interactive approach to quad remeshing that allows users to sketch a coarse curve network, where (i) every segment of the curve network may become part of an edge of a quad mesh and (ii) every intersection between curves may become a vertex. The interior of every bounded polygon may be meshed to match a user-provided number of edges, while singularities are automatically inserted when needed. The free-form, flexible, and explicitly controlled approach to "sketching" the edge flow described herein is enabled by a representation of the quad mesh that allows a controlled number of singularities in each patch (rather than focusing on patches with regular connectivity inside). This representation of the quad mesh also explicitly controls the number of subdivisions of each patch side. Singularities can also be moved geometrically as well as topologically inside each patch. This approach provides control when desired, as well as simultaneously removing the tediousness of previous approaches and enabling fast interactive experimentation until the desired connectivity is found. The coarse curve network is stored in a data structure that supports efficient insertion and removal of curves and links the curve network with the tessellated patches. Furthermore, embodiments disclosed herein support arbitrary number of subdivisions on each side of a patch as long as their sum is even.

Also disclosed are two user interface tools, namely a spine sketching tool and an autocompletion tool. The spine sketching tool generates a closed region in the curve network using a single stroke. The region is filled with a quad mesh having an edge flow aligned with the single stroke. The autocompletion tool analyzes a region around the mouse cursor and suggests a closed region that connects the existing parts of the curve network in the vicinity of the cursor. The autocompletion tool may be used to connect regions generated with the spine tool. Additionally, embodiments disclosed herein also provide specialized tools that allow to change the curve network directly or to quickly tessellate cylindrical or conic regions.

FIG. 1 illustrates a system 100 for sketch-based generation and editing of quad meshes. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include UNIX, versions of the Microsoft Windows® operating system and distributions of the Linux® operating system. Additional examples of the operating system include custom operating systems for smart phones and gaming consoles, including the custom operating systems for systems such as the Microsoft Xbox 360®, Nintendo Wii® and Sony PlayStation® 3. More generally, any operating system supporting the functions disclosed herein may be used. The processor 104 is included to be representative of a single CPU, multiple CPUs, a single CPU having multiple processing cores, and the like. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, SAN storage, NAS storage, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 contains a quad mesh application 112, which is an application generally configured to allow users to sketch a coarse curve network on a three dimensional model and automatically refine the coarse mesh into a quadrilateral mesh of arbitrary low or high resolution. The quad mesh application 112, given a patch formed by a network of curves and a segment count per edge curve, may automatically quadrangulate the interior of the patch by using a small set of pattern templates using information local to the patch. The quad mesh application 112 also provides a spine-sketching user interface that takes a single stroke inputted by a user, and generates a rectangular patch whose center line closely follows the user's stroke, and automatically connects the generated patch to existing patch boundaries. Further still, the quad mesh application 112 provides, through an autocomplete tool of the user interface, real-time suggestions of likely patch candidates in proximity of existing patch boundaries. The suggested patch snaps to any nearby existing patch boundaries, with priority given to snapping to corners. The quad mesh application 112 automatically quandrangulates a quad mesh for all patches generated by the spine sketching and autocomplete tools. As shown, storage 108 contains a mesh data 115, which stores data related to the curve networks generated by the quad mesh application 112, as well as three dimensional model templates that a user may manipulate using the quad mesh application 112.

FIG. 2A illustrates techniques for generating and editing of quad meshes, according to one embodiment. Generally, FIG. 2A illustrates embodiments where a user may draw individual lines on a three-dimensional surface mesh model in order to create patches containing quad meshes using the quad mesh application 112. In example 201 of FIG. 2A, a user has drawn two intersecting lines. When the quad mesh application 112 detects an intersection between two lines, as shown in example 202, it may mark the intersection point $202_1$ as a marker of the resulting quad mesh patches. When the quad mesh application 112 detects a loop with three or more corners, such as in example 203, the quad mesh application 112 generates a patch enclosed by points $203_{1-4}$. Furthermore, the quad mesh application 112 generates a quad mesh 210 for the patch enclosed by points $203_{1-4}$ as shown in example 204. Advantageously, a user may modify the topology of the quad mesh by changing the number of edge subdivisions by clicking on an edge, which results in the insertion of irregular vertices 211, 212 in the quad mesh of example 205. Any changes to the mesh topology are localized to patches adjacent to edited boundaries. Alternatively, the user may modify the topology of the quad mesh by moving the pair of irregular vertices with a mouse drag. As shown in example 206, the user has dragged vertex 211 from the position in example 205, resulting in an adjustment of the mesh topology. The user may also modify the distance between vertices 211, 212 (not shown). Further still, the quad mesh application 112 allows the creation of a topologically flexible curve network, as it supports the creation of T-junctions, such as T-junction 213 shown in example 207, triangular patches 215, and pentagonal patches 216 as shown in example 208. T-junctions are represented using blue semicircles, as shown in example 207.

The interior of each patch is tessellated by generating a mesh made of quads (and eventually triangles or other polygons) that satisfies the number of subdivisions specified by the user at each edge of its boundary. The tessellation may be generated following a set of tessellation rules encoded in patterns like the ones presented in FIG. 2B. Depending on the number of subdivisions on the boundary, a pattern is selected and optimal parameters for it are automatically computed. The parameters control the number of additional edge loops to be added inside the pattern or the amount of padding to be added to the borders. Each pattern also has a set of user-controllable parameters that change the position of the singularities in its interior, without changing the number of subdivision on the boundary. Additional patterns can be added to tessellate polygonal regions with more than 4 edges.

FIG. 2B illustrates techniques for generating quad meshes, according to one embodiment. Generally, embodiments disclosed herein implement topological patterns used to quadrangulate rectangular and triangular regions. As shown, for a rectangular region, four different patterns 231-234 are used, while three different patterns 235-237 are used for a triangular region. Vertices (such as vertex 240) with a red circle represent corners, while vertices with orange and blue fill represent irregular vertices with valence five and three, respectively (such as vertices 241 and 242). Note that valences of vertices at the patch boundary are counted differently; the valence of a vertex at a patch corner is the number of its adjacent edges plus two, while the valence of a vertex between patch corners is the number of its adjacent edges plus one. $p_x$ and $p_y$ represent a regular grid of quadrilaterals padded to the corresponding side of the rectangle (shown only with pattern 231 for brevity). $p_B$, $p_R$, and $p_L$ are similarly defined for the triangle. α and β represent the number of times an edge flow is inserted at these locations. As shown, all patterns include at least one side that has only one edge, which helps guarantee valid quadrangulation of the region even when the specified number of edge subdivisions is very small and extreme.

Each pattern is a "minimal" instance of a certain graph configuration, from which an infinite family of patch connectives can be produced by varying number of edge flow insertions α and β, and the number of outer paddings, namely horizontal and vertical paddings for four-sided patches ($p_x$ and $p_y$) (as shown in example 250), and triangle paddings for three-sided patches ($p_B$, $p_R$, and $p_L$). A single outer padding step adds an edge loop parallel to the patch side, while insertion of inner edge flows can be performed in certain directions by the blue and purple arrows in example 250. For rectangular patches, the outer padding can be performed on both opposing sides, which effectively translates the irregular vertices in parallel. In addition, with patterns 233 and 234 for rectangular regions and patterns 236 and 237 for triangular regions, the padding can be split and inserted in the middle of the patch, which effectively makes the distance between irregular vertices larger (see bottom of pattern 233). Any variation of these parameters does not change the number of irregular vertices, as the number of irregular vertices is fixed per pattern. In example 251, corners are indicated by red circles, with blue circles representing irregular vertices with valence three (such as vertex 253), and yellow circles (such as vertex 255) denoting irregular vertices having valence five.

Generally, the quad mesh application 112 selects a pattern 231-237 based on the specified number of edge subdivisions for each side of the boundary. For rectangular regions, the quad mesh application 112 denotes the differences between the number of edge subdivisions between opposing sides as $d_x=B-T$ and $d_y=R-L$. Without loss of generality, the quad mesh application 112 assumes an order of sides such that $d_x \geq d_y$. When $d_x=d_y=0$ and $d_x=d_y>0$, the quad mesh application 112 selects a regular grid and pattern 231, respectively. If $d_x>d_y$, the quad mesh application 112 determines whether the specified number of edge subdivisions is extreme, i.e., $B>R+T+L$. If this is not true, then the quad mesh application 112 selects pattern 232, otherwise the quad mesh application 112 selects patterns 233 and 234 if $d_y=0$ and $d_y>0$, respectively.

For triangular regions, the quad mesh application 112 assumes an order of sides such that $B \geq R \geq L$. The quad mesh application 112 then determines whether the number of edge subdivisions is extreme, i.e., whether $B>R+L$. If the number of edge subdivisions is not extreme, the quad mesh application 112 selects pattern 235. Otherwise, the quad mesh application 112 selects pattern 236 if $R=L$, and selects pattern 237 if $R>L$. Once the appropriate pattern is selected, the quad mesh application 112 calculates padding parameters ($p_x$ and $p_y$ for rectangular regions, and $p_B$, $p_R$, and $p_L$ for triangular regions) such that the pattern satisfies the specified number of boundary edge subdivisions. The padding is evenly distributed on all valid sides of a patch and it can be interactively modified by the user to move the singularities inside the patch.

FIG. 3 illustrates examples of using a spine sketching tool for generating patches, according to one embodiment. In at least one embodiment, the spine sketching tool is a component of the quad mesh application 112. When using the spine sketching tool, a user may draw a single stroke that is used by the quad mesh application 112 to generate a patch whose center line closely follows the user's stroke. As shown in example 301, a user has drawn a line from point $301_1$ to $301_2$. In response, the quad mesh application 112 generates a patch 302 defined by endpoints $302_{1-4}$. The patch width generated by the quad mesh application 112 may be based on a user-controlled brush size. Advantageously, if the generated patch is near an existing patch boundary, the quad mesh application 112 may connect the patches. The quad mesh application 112 supports at least two different directions for snapping generated patches to existing patches. Orthogonal snapping, as shown in example 303, occurs when the stroke's endpoints 311, 312 are close to an existing patch boundary, such as the boundary of patch 313. The quad mesh application 112 therefore snaps the patch defined by points $303_{1-4}$ to patch 313. Parallel snapping, as shown in element 304, occurs when the stroke's endpoints 314, 315 are parallel to a nearby patch boundary, such as the boundary of patch 316. The quad mesh application 112 therefore snaps the patch defined by points $304_{1-4}$ to patch 316.

The quad mesh application 112 also snaps if corners are on a boundary, in which case the resulting patch snaps to them. As shown in example 305, the user's sketch from endpoints 317, 318 causes the quad mesh application 112 to create a patch defined by points $305_{1-4}$, that is snapped to point $305_3$, a corner of the patch 319. Similarly, as shown in example 306, the quad mesh application 112 creates a patch defined by points $306_{1-4}$ based on the user's stroke from endpoints 320, 321. The quad mesh application 112 then snaps the patch defined by points $306_{1-4}$ to point $306_3$, which is a corner of the patch 322. Advantageously, the quad mesh application 112 may stop and resume snapping at some point along the stroke. As shown in example 307, snapping of the patch defined by points $307_{1-4}$ stops at point $307_5$, as the snapped patch boundary deviates from the stroke defined by endpoints 323, 324 beyond a specified threshold. Therefore, only part of the patch defined by points $307_{1-4}$ is snapped to the patch 325. Similarly, if the brush stroke stops overlapping with an existing patch, the quad mesh application 112 may stop snapping the new patch to the existing patch at this point. This embodiment is depicted in example 308, where the quad mesh application 112 stops snapping the patch defined by points $308_{1-4}$ at point 308₅, which is where the stroke defined by endpoints 326, 327 begins to deviate from the patch 328.

FIG. 4 illustrates an autocomplete tool for generating patches, according to one embodiment. Generally, the autocomplete tool automatically generates one or more candidate patches corresponding to a position of the user's mouse over the 3D surface mesh model, which the user may choose to accept or reject. The quad mesh application 112 provides the autocomplete tool in one embodiment. As shown in example 401, the quad mesh application 112 suggests the patch 412 in proximity of the boundaries of patches 410, 411. When a user clicks on the suggested patch 412, the quad mesh application 112 adds the patch, as shown in example 402. The quad mesh application 112, when providing the autocomplete tool, snaps the accepted suggestion to any nearby patch boundaries, giving priority to snapping to existing patch corners, as shown in example 402. In one embodiment, the quad mesh application 112 suggests the largest possible quadrangular patch, such as patch 415 for snapping to patches 413, 414 in example 403. However, the quad mesh application 112 may also suggest smaller alternatives, such as patch 416 in example 404. In addition, instead of the quadrangular patch 419 of example 405, the quad mesh application 112 may suggest triangular patch 420 of example 406 to snap to existing patches 417, 418.

FIG. 5 illustrates curve network representations 501 and 502, according to one embodiment. Generally, embodiments disclosed herein provide a curve network representation that supports arbitrary curve topology (including open endpoints), curve-by-curve construction (instead of patch-by-patch), instant detection of loops and their orientation, and handling of elements in different levels (e.g., individual curve vertices and coarse quad mesh vertices) in a unified way. When a user sketches a curve on the model surface, the quad mesh application 112 densely samples the curve, and adds the resulting points and segments as curve network vertices and half-edges, respectively. Therefore, as shown in representation 501, the quad mesh application 112 generates black curve network vertices 510, orange open endpoints 515, purple corners 520, and blue half-edges 535 (not all items are marked in representations 501, 502 for clarity). In addition, each vertex 510 stores a surface normal in addition to its three dimensional position. When the sketched curve intersects with an existing curve segment, the quad mesh application 112 computes their intersection and assigns corner flags to red half-edges 530 incident to the intersection. A corner vertex is defined as the vertex 510 being pointed to by a corner half-edge 530. A T-junction is represented as a half-edge that is incident on a corner vertex, but is not associated with the corner flag. T-junctions are depicted in the representations 501, 502 using blue semicircles 525.

When new half-edges are added to the curve network, the quad mesh application 112 traces over half-edges to find consecutive half-edges connecting vertices that are either open endpoints 515 or corners 520. From these consecutive half-edges, the quad mesh application 112 generates a new entity called a halfchain that refers to the beginning and end of the sequence. The halfchains are depicted by green arrows 540 in the representations 501, 502. When the quad mesh application 112 detects consecutive halfchains that form a loop with three, four, or five corners, the quad mesh application 112 generates a patch 555, denoted in gray in the representations 501, 502. The quad mesh application 112 assigns each halfchain in the loop a reference to the generated patch. The quad mesh application 112 also assigns a reference from the patch to one of the halfchains. A pair of opposing halfchains shares a number of edge subdivisions used for quadrangulating the patch.

The quad mesh application 112 obtains geometric information such as 3D position and normals for vertices of the patch boundary by sampling along their corresponding curve network segment 535. For vertices inside a patch, geometric information is interpolated from the boundaries using uniform Laplacian smoothing, followed by projection to the model surface along the interpolated normal. Each patch may be a separate quad mesh with its own set of vertices, faces, and half-edges. In representation 502 the white points 550 represent quad mesh vertices while brown arrows 545 represent boundary half-edges of patches. To establish adjacency information between neighboring patches, each half-edge on the boundary of each patch stores a reference to the halfchain it belongs to, and an index representing its position on the halfchain, allowing the quad mesh application 112 to easily trace a global edge flow across neighboring patches.

In one embodiment, when the quad mesh application 112 detects a loop of halfchains, it generates a patch only if the loop is oriented counterclockwise when viewed from the exterior of the surface. To detect a loop's orientation, the quad mesh application 112 computes:

$$A = \sum_i \frac{1}{2}((p_i - c) \times (p_{i+1} - c)) \cdot n_i \quad \text{(Equation 1)}$$

In Equation 1, $p_i$ and $n_i$ denote position and the normal of the i-th vertex on the loop, respectively, and c denotes the loop's center of mass. The quad mesh application 112 regards A as a rough estimate of the signed area of a region on the surface enclosed by the loop, and the loop orientation is detected as counterclockwise if $A > \lambda l^2/4\pi$, where l is the loop's length, and a threshold $\lambda = 0.1$.

When analyzing curves representing existing patch boundaries for spine sketching and autocompletion, the quad mesh application 112 locally parameterizes the surface model near the user's mouse input, and then analyzes the configuration of nearby curves in this two-dimensional parameter space, making subsequent processes far simpler. For spine sketching, the quad mesh application 112 completes the analysis as described with reference to FIG. 3. For autocompletion, the quad mesh application 112 bases the analysis on the number of corners and their respective angles formed by the boundary curves, described in greater detail with reference to FIG. 6.

FIG. 6 illustrates configurations 601-614 considered by the quad mesh application 112 implementing the autocomplete tool, according to one embodiment. For each configuration 601-614, the gray regions 615 represent existing patches, while the dotted lines 630 represent the region analyzed by the quad mesh application 112. Black points 635 represent existing corners of the existing patches, while red points 625 represent corners created by the quad mesh application 112 in implementing the autocomplete algorithm. The green regions 620 represent one of the patches generated and suggested by the autocomplete tool of the quad mesh application 112. Not all gray regions 615, dotted lines 630, red points 625, and black points 635 are marked for clarity. The quad mesh application 112 considers cases where there are zero (configuration 601), one (configurations 602-603), two (configurations 604-607), three (configurations 608-610), and four (configuration 611) corners on a sequence of boundary curves. The quad mesh application 112 also considers cases where there are two separate sequences of the boundary curves, such as in configurations 612-614. Generally, to implement the autocomplete tool, the quad mesh application 112 initially sets the region to be analyzed as the locally parameterized region 630. After mapping the nearby patches to the parameter space, the algorithm counts the number of corners of the nearby patches and measures the angles among such corners in the parameter space, which is then used to choose an appropriate configuration from all the cases considered in configurations 601-614. To produce suggestions with smaller sizes, the quad mesh application 112 repeatedly shrinks the region 630 to be analyzed and executes the analysis algorithm while keeping local parameterization.

FIG. 7 is a diagram 700 showing techniques to edit quad meshes, according to one embodiment. Generally, the placement of corners has a fundamental influence on the resulting mesh topology. Therefore, embodiments disclosed herein provide a tool for efficient editing of corner configurations. The user can delete a patch corner with two adjacent curve segments, or create a new corner on a curve segment by clicking. As shown in FIG. 7, a user clicking on corner 702 of patch 701 results in a patch 703 without the removed corner. When the user clicks on the corner, the quad mesh application 112 modifies the quad mesh of the patch. For example, the quad mesh application 112 may modify the quad mesh 704 of patch 701 to include the singularity 706 and updated quad mesh 705. Furthermore, the quad mesh application 112 allows the user to switch between a T-junction and an ordinary corner by dragging the mouse starting near the respective vertex, and releasing the mouse button at the vertex position. As shown in patch 707, the user makes a drag illustrated by line 708 to the point 713. Responsive to this drag, the quad mesh application 112 converts the point 713 from a corner to a T-Junction 714 of patch 710. The quad mesh application 112 also updates the quad mesh 711, which includes singularity 709, to the updated quad mesh 712 of patch 710, which no longer includes the singularity 709.

FIG. 8 is a diagram 800 depicting cylinder sketching techniques, according to one embodiment. Embodiments disclosed herein provide advanced support for sketching on cylindrical parts, such as arms and legs. When a user sketches a stroke connecting a pair of loops (typically created using a planar cutting tool), the quad mesh application 112 may identify corresponding pairs of points on the loops based on arc length parameterization and connects them by tracing geodesic paths, producing multiple patches simultaneously. As shown in FIG. 8, when a user sketches line 810 on cylinder 801, connecting loops 807, 808, the quad mesh application 112 generates patches 815 as shown on cylinder 802, along with endpoints 821 and 822. If a loop, such as loop 811 in finger 803, encloses a disc-like region, the quad mesh application 112 also generates a patch filling that region, as indicated by patch 811 in modified finger 804. Finally, the quad mesh application 112 also connects a pair of loops in a planar region. As shown in image 805, when stroke 820 connects loops 821 and 822, the quad mesh application 112 creates a set of patches 830 connecting the loops, as shown in image 806.

FIG. 9 illustrates techniques to align a quad mesh with salient geometric features of a model, according to one embodiment. It is generally desirable that a quad mesh aligns with salient geometric features, such as ridges and valleys of the original model. To facilitate curves that accurately align with such features, embodiments disclosed herein provide a curve modification tool that iteratively moves a curve along the gradient direction of the mean curvature of the surface. As shown in FIG. 9, the quad mesh application 112 moves the curve 910 from its location on model 901 such that it becomes modified curve 911 on model 902.

FIG. 10 illustrates a method 1000 to generate and edit quad meshes, according to one embodiment. The steps of the method 1000 may be performed by the quad mesh application 112. At step 1010, the quad mesh application 112 provides a curve network representation to store information related to the quad meshes and curve networks. The data structure provides a curve network representation that supports arbitrary curve topology (including open endpoints), curve-by-curve construction (instead of patch-by-patch), instant detection of loops and their orientation, and handling of elements in different levels (e.g., individual curve vertices and coarse quad mesh vertices) in a unified way. The representation includes a new entity called a halfchain that is created when consecutive half-edges connect vertices that are either corners or open endpoints.

At step 1020, the quad mesh application 112 provides a spine sketching tool that automatically generates quadrangulated patches based on a single stroke entered by a user. The spine sketching tool automatically snaps generated patches to nearby existing patches. The spine sketching tool was described in greater detail with reference to FIG. 3. At step 1030, the quad mesh application 112 provides an autocomplete tool that generates quadrangulated patches corresponding to a location of the user's mouse. When the user selects the patch, it is snapped to nearby existing patches. The autocomplete tool was described in greater detail with reference to FIG. 4. At step 1040, the quad mesh application 112 imports a three dimensional (3D) surface mesh model to be manipulated by the user. At step 1050, the quad mesh application 112 generates quadrangulated patches responsive to user input. The patches may be generated by the user's free-form drawing of lines that form loops, the spine sketching tool, and the autocomplete tool. The generation of quadrangulated patches is described in greater detail with reference to FIG. 11. At step 1060, the quad mesh application 112 allows the user to manipulate patches and quad meshes. For example, the quad mesh application 112 allows the user to delete patch corners with two adjacent curve segments, or create a new corner on a curve segment with a click. The quad mesh application 112 also allows the user to switch between a T-junction and ordinary corner by dragging the mouse near the respective vertex, and releasing the mouse button at the vertex position. At step 1070, the quad mesh application 112 may store the edited 3D mesh model responsive to user input.

FIG. 11 illustrates a method 1100 corresponding to step 1050 to generate quadrangulated patches, according to one embodiment. The patches may be generated responsive to user input drawing individual lines on the 3D mesh model, or by user input using the spine sketching tool, or by user input accepting suggestions provided by the autocomplete tool. In one embodiment, the quad mesh application 112 performs the steps of the method 1100. At step 1110, the quad mesh application 112 densely samples a curve to obtain curve points and segments. Once the quad mesh application 112 samples the curve, it stores points as vertices and segments as half-edges in the curve network. The quad mesh application 112 also stores a surface normal and 3D position of each vertex. At step 1120, the quad mesh application 112 computes intersection points of the sketched curve and existing curves.

At step 1130, the quad mesh application 112 assigns corner flags to half-edges incident to the intersection points computed at step 1120. A corner vertex at this point may be defined as corners being pointed to by a corner half-edge. At step 1140, the quad mesh application 112 traces new half-edges to identify consecutive half-edges connecting corner vertices or open endpoints. At step 1150, the quad mesh application 112 creates a halfchain that refers to the beginning and endpoints of the sequence created by half-edges identified at step 1140. At step 1160, the quad mesh application 112 generates a patch upon determining that consecutive halfchains create a loop of three, four, or five corners that has correct orientation. In one embodiment, the correct loop orientation is counterclockwise when viewed from the external of the surface. Each halfchain in the loop is assigned a reference to the generated patch, and the patch is assigned a reference to one of these halfchains. A pair of opposing halfchains shares a number of edge subdivisions used for quadrangulating the patch. Generally, each patch is a separate quad mesh with its own set of vertices, faces, and half-edges. To establish adjacency between neighboring patches, each half-edge on the boundary of each patch stores a reference to the halfchain it belongs to, and an index representing its position on the halfchain. This allows the quad mesh application 112 to easily trace a global edge flow across neighboring patches.

FIG. 12 illustrates components of a quad mesh application 112, according to one embodiment. As shown, the quad mesh application 112 includes a spine sketching tool 1201, which is a component of the quad mesh application 112 that generates a quadrangulated patch responsive to a single stroke drawn by a user. The spine sketching tool 1201, or the quad mesh application 112, may snap any generated patches to neighboring patches. The user can adjust the width of the patch by setting a brush width size. The quad mesh application 112 also includes an autocomplete tool 1202, which is generally configured to generate quadrangulated patches that correspond to the mouse's current location on the 3D mesh model. The user may accept the suggested patch by clicking on it. Generally, the autocomplete tool 1202 analyzes the region around the mouse cursor and suggests a closed region that connects existing parts of the curve network in the vicinity of the cursor. Once the user accepts the patch, the autocomplete tool 1202, or the quad mesh application 112, may snap the accepted patch to neighboring patches.

Advantageously, embodiments disclosed herein provide for enhanced retopology techniques. Specifically, embodiments disclosed herein provide a spine sketching tool that generates quadrangulated patches on a 3D mesh model mirroring a single user stroke. An autocomplete tool automatically suggests quadrangulated patches that may be accepted by the user. Users may edit the mesh topology by changing the number of edge subdivisions at patch boundaries, as well as topologically moving irregular vertices within patches. A cylinder sketching tool allows users to create meshes for cylindrical objects and connect nested loops. Collectively, embodiments disclosed herein allow artists to quickly remesh complex 3D shapes into quads while precisely controlling the density and edge flow of the quads. Furthermore, embodiments disclosed herein are useful for editing quad meshes consisting of patches of regular grids automatically generated using quad remeshing algorithms.

In the foregoing, reference has been made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the quad mesh application could execute on a computing system in the cloud and quadrangulate rectangular and triangular regions on a three-dimensional model. In such a case, the quad mesh application could create a refined quad mesh and store the quad mesh at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

To facilitate understanding, identical reference numerals have been used, where possible, to designate identical elements that are common to the figures. It is contemplated that elements disclosed in one embodiment may be beneficially utilized on other embodiments without specific recitation.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
 sampling a plurality of points and a plurality of segments of a curve on a surface of a three-dimensional model;
 storing each sampled point as a respective vertex of a plurality of vertices and each sampled segment as a respective half-edge in a curve network of the model surface;
 upon determining that a first half-edge and a second half-edge connect two of the plurality of vertices, generating a first halfchain connecting the first half-edge and the second half-edge, wherein each connected vertex comprises either a corner or an open endpoint; and
 upon determining that three consecutive halfchains form a loop comprising at least three corners, generating a first patch for a space enclosed by the loop, wherein the first patch is represented as a quad mesh with a respective set of vertices, faces, and half-edges.

2. The method of claim 1, further comprising:
 assigning a corner flag to each half-edge incident to an intersection point of the curve and a second curve segment.

3. The method of claim 1, wherein each half-edge on a boundary of the first patch stores a reference to one of the at least three consecutive halfchains the half-edge belongs to and an index representing its position on the halfchain the half-edge belongs to.

4. The method of claim 1, wherein the first patch is created in response to user input defining the curve, wherein a centerline of the first patch mirrors the stroke, and wherein a user-controlled brush size defines a width of the first patch.

5. The method of claim 4, further comprising:
 upon determining:
 (i) a set of endpoints of the stroke are in proximity to a boundary of the second patch, (ii) the stroke is parallel to the boundary of the second patch, or (iii) one or more corners of the first patch are on the boundary of the second patch, snapping the first patch to a second patch.

6. The method of claim 1, wherein the first patch is selected from a plurality of candidate patches based on an analysis of a number of corners and respective angles formed by each candidate patch and wherein each of the plurality of candidate patches are generated responsive to the user moving a mouse cursor approximate to an existing patch, the method further comprising:

presenting the first patch to the user for approval.

7. The method of claim 1, further comprising:

deleting a first corner of the first patch responsive to user input.

8. The method of claim 1, further comprising:

responsive to receiving user input at a first point, adding an additional corner to the curve at the first point.

9. The method of claim 1, further comprising:

receiving user input comprising a mouse drag starting at a first position proximate to a T-junction and released at a second position proximate to the T-junction; and converting the T-junction to a first corner responsive to receiving the user input.

10. The method of claim 1, further comprising:

moving the curve proximate to a feature of the model surface prior to generating the first patch.

11. A computer program product, comprising:

a non-transitory computer-readable storage medium having computer-readable program code embodied therewith, the computer-readable program code executable by a processor to perform an operation comprising:

sampling a plurality of points and a plurality of segments of a curve on a surface of a three-dimensional model;

storing each sampled point as a respective vertex of a plurality of vertices and each sampled segment as a respective half-edge in a curve network of the model surface;

upon determining that a first half-edge and a second half-edge connect two of the plurality of vertices, generating a first halfchain connecting the first half-edge and the second half-edge, wherein each connected vertex comprises either a corner or an open endpoint; and upon determining that three consecutive halfchains form a loop comprising at least three corners, generating a first patch for a space enclosed by the loop, wherein the first patch is represented as a quad mesh with a respective set of vertices, faces, and half-edges.

12. The computer program product of claim 11, the operation further comprising:

assigning a corner flag to each half-edge incident to an intersection point of the curve and a second curve segment.

13. The computer program product of claim 11, wherein each half-edge on a boundary of the first patch stores a reference to one of the at least three consecutive halfchains the half-edge belongs to and an index representing its position on the halfchain the half-edge belongs to.

14. The computer program product of claim 11, wherein the first patch is created in response to user input defining the curve, wherein a centerline of the first patch mirrors the stroke, and wherein a user-controlled brush size defines a width of the first patch.

15. The computer program product of claim 11, the operation further comprising:

upon determining:

(i) a set of endpoints of the stroke are in proximity to a boundary of the second patch, (ii) the stroke is parallel to the boundary of the second patch, or (iii) one or more corners of the first patch are on the boundary of the second patch, snapping the first patch to a second patch.

16. The computer program product of claim 11, wherein the first patch is selected from a plurality of candidate patches based on an analysis of a number of corners and respective angles formed by each candidate patch and wherein each of the plurality of candidate patches are generated responsive to the user moving a mouse cursor approximate to an existing patch, the operation further comprising:

presenting the first patch to the user for approval.

17. The computer program product of claim 11, the operation further comprising:

deleting a first corner of the first patch responsive to user input.

18. The computer program product of claim 11, the operation further comprising:

responsive to receiving user input at a first point, adding an additional corner to the curve at the first point.

19. The computer program product of claim 11, the operation further comprising:

receiving user input comprising a mouse drag starting at a first position proximate to a T-junction and released at a second position proximate to the T-junction; and converting the T-junction to a first corner responsive to receiving the user input.

20. The computer program product of claim 11, the operation further comprising:

moving the curve proximate to a feature of the model surface prior to generating the first patch.

21. A system, comprising:

one or more computer processors; and a memory containing a program which when executed by the one or more computer processors, performs an operation, the operation comprising:

sampling a plurality of points and a plurality of segments of a curve on a surface of a three-dimensional model;

storing each sampled point as a respective vertex of a plurality of vertices and each sampled segment as a respective half-edge in a curve network of the model surface;

upon determining that a first half-edge and a second half-edge connect two of the plurality of vertices, generating a first halfchain connecting the first half-edge and the second half-edge, wherein each connected vertex comprises either a corner or an open endpoint; and upon determining that three consecutive halfchains form a loop comprising at least three corners, generating a first patch for a space enclosed by the loop, wherein the first patch is represented as a quad mesh with a respective set of vertices, faces, and half-edges.

22. The system of claim 21, the operation further comprising:

assigning a corner flag to each half-edge incident to an intersection point of the curve and a second curve segment.

23. The system of claim 21, wherein each half-edge on a boundary of the first patch stores a reference to one of the at least three consecutive halfchains the half-edge belongs to and an index representing its position on the halfchain the half-edge belongs to.

24. The system of claim 21, wherein the first patch is created in response to user input defining the curve, wherein a centerline of the first patch mirrors the stroke, and wherein a user-controlled brush size defines a width of the first patch.

25. The system of claim 21, the operation further comprising:
   upon determining:
      (i) a set of endpoints of the stroke are in proximity to a boundary of the second patch,
      (ii) the stroke is parallel to the boundary of the second patch, or
      (iii) one or more corners of the first patch are on the boundary of the second patch,
   snapping the first patch to a second patch.

26. The system of claim 21, wherein the first patch is selected from a plurality of candidate patches based on an analysis of a number of corners and respective angles formed by each candidate patch and wherein each of the plurality of candidate patches are generated responsive to the user moving a mouse cursor approximate to an existing patch, the operation further comprising:
   presenting the first patch to the user for approval.

27. The system of claim 21, the operation further comprising:
   deleting a first corner of the first patch responsive to user input.

28. The system of claim 21, the operation further comprising:
   responsive to receiving user input at a first point, adding an additional corner to the curve at the first point.

29. The system of claim 21, the operation further comprising:
   receiving user input comprising a mouse drag starting at a first position proximate to a T-junction and released at a second position proximate to the T-junction; and
   converting the T-junction to a first corner responsive to receiving the user input.

30. The system of claim 21, the operation further comprising:
   moving the curve proximate to a feature of the model surface prior to generating the first patch.

\* \* \* \* \*